US006184903B1

United States Patent
Omori

(10) Patent No.: US 6,184,903 B1
(45) Date of Patent: *Feb. 6, 2001

(54) APPARATUS AND METHOD FOR PARALLEL RENDERING OF IMAGE PIXELS

(75) Inventor: Mutsuhiro Omori, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/995,969

(22) Filed: Dec. 22, 1997

(30) Foreign Application Priority Data

Dec. 27, 1996 (JP) .................................................. 8-350462

(51) Int. Cl.[7] ...................................................... G06F 15/80
(52) U.S. Cl. ........................................... 345/505; 345/441
(58) Field of Search ............................ 345/418, 441–443, 345/501–506

(56) References Cited

U.S. PATENT DOCUMENTS

| 5,392,385 | * | 2/1995 | Evangelisti et al. | ................. | 345/431 |
| 5,422,991 | * | 6/1995 | Powler | ................. | 345/443 |
| 5,440,682 | * | 8/1995 | Deering | ................. | 345/503 |
| 5,457,775 | * | 10/1995 | Johnson, Jr. et al. | ............... | 345/441 |
| 5,701,405 | * | 12/1997 | Kelley et al. | ........................ | 345/441 |
| 5,704,025 | * | 12/1997 | Berry | ................. | 345/431 |
| 5,706,415 | * | 1/1998 | Kelley et al. | ........................ | 345/426 |
| 5,821,950 | * | 10/1998 | Rentschler et al. | .................. | 345/505 |
| 5,872,902 | * | 2/1999 | Kuchkuda et al. | .................. | 345/430 |

* cited by examiner

Primary Examiner—Ulka J. Chauhan
(74) Attorney, Agent, or Firm—Fulwider Patton Lee & Utecht, LLP

(57) ABSTRACT

There is provided a rendering system for processing pixels corresponding to a predetermined graphic in parallel by dividing a two-dimensional image coordinate system into areas each composed of a plurality of pixels of N pixels in a first direction and M pixels in a second direction perpendicular to the first direction, i.e. N×M pixels in total, and by allocating N×M computing sections respectively to the N×M pixels contained in that area. Specifically, the rendering system comprises a calculating section for calculating variations of the rendering data with respect to the first and second directions necessary for interpolating values of the rendering data in each pixel within a predetermined graphic from predetermined apex data of the predetermined graphic and an initial value of the rendering data with respect to the coordinate in the first direction which becomes the reference for computing the rendering data with respect to the second direction by means of interpolation by using the value of the predetermined apex data and the variation of the rendering data with respect to the first direction; and N×M computing sections for calculating the rendering data of the pixel in the second direction by means of interpolation by using the above-mentioned initial value and the variation of the rendering data with respect to the second direction. Thereby, the present invention allows the pixels to be rendered in parallel at high speed in the definition of sub-pixel level.

2 Claims, 6 Drawing Sheets

APPARATUS AND METHOD FOR PARALLEL RENDERING OF IMAGE PIXELS

BACKGROUND OF THE INVENTION

1. Field of the Invention

The present invention relates to a rendering method and a rendering system in general and more particularly to a rendering method and a rendering system for drawing pixels corresponding to a predetermined graphic by dividing a two-dimensional image coordinate system into N pixel areas in a first direction and M pixel areas in a second direction which is perpendicular to the first direction, i.e. N×M pixel areas in total, and by allocating N×M computing sections respectively to the N×M pixels in each of the divided areas.

2. Description of the Related Art

With the progress of the resent semiconductor technology, the processability of an image processing system is also increasing.

In so-called computer graphics, there is a case when a plurality of two-dimensional graphics (polygons) having a predetermined fundamental shape (e.g. triangle) is used in displaying a three-dimensional object on a display screen.

A rendering process is then implemented on such polygons by a predetermined arithmetic circuit to calculate a value of brightness of each pixel within the polygon and to render the polygon in correspondence to the value of brightness.

Some system for rendering polygons as described above implements the polygon rendering process at high speed by operating a plurality of arithmetic circuits in parallel.

In utilizing such a plurality of rendering circuits, a display screen 71 is divided as shown in FIG. 1 into a same number of areas with the rendering circuits 61 through 64 (four in FIG. 1) so that each rendering circuit implements the rendering process in the corresponding area.

For instance, the rendering circuit 61 implements the rendering process in a quarter of area (area A) at the upper left corner of the display screen 71 and the rendering circuit 62 implements the rendering process in a quarter of area (area B) at the upper right corner of the display screen 71.

Further, the rendering circuit 63 implements the rendering process in a quarter of area (area C) at the lower left corner of the display screen 71 and the rendering circuit 64 implements the rendering process in a quarter of area (area D) at the lower right corner of the display screen 71.

However, when the display screen is divided as such, there has been a problem that when a polygon to be rendered is contained only within an area allocated to any one of the rendering circuits for example, a time required for processing it is not shortened even though the plurality of rendering circuits are provided because the rendering process is implemented on the polygon only by that one rendering circuit.

There has been also another problem that although it is conceivable to implement an interleave process for implementing the rendering process by allocating pixels per predetermined number to each rendering circuit, it is difficult to render in the definition of sub-pixel level.

OBJECT AND SUMMARY OF THE INVENTION

Accordingly, it is an object of the present invention to provide a rendering system and a rendering method which allow the time required for rendering polygons to be shortened and to render in the definition of sub-pixel level by providing a plurality of rendering circuits.

In order to achieve the above-mentioned object, according to the present invention, the rendering system for processing pixels corresponding to a predetermined graphic in parallel by dividing a two-dimensional image coordinate system into areas each composed of a plurality of pixels of N pixels in a first direction and M pixels in a second direction which is perpendicular to the first direction, i.e. N×M pixels in total, and by allocating N×M computing sections respectively to the N×M pixels contained in that area, comprises a calculating section for calculating variations of the rendering data with respect to the first and second directions necessary for interpolating values of the rendering data in each pixel within a predetermined graphic from predetermined apex data of the predetermined graphic and an initial value of the rendering data with respect to the coordinate in the first direction which becomes the reference for computing the rendering data with respect to the second direction by means of interpolation by using the value of the predetermined apex data and the variation of the rendering data with respect to the first direction; and N×M computing sections for calculating the rendering data of the pixel in the second direction by means of interpolation by using the above-mentioned initial value and the variation of the rendering data with respect to the second direction.

Further, the rendering method for processing pixels corresponding to a predetermined graphic in parallel by dividing a two-dimensional image coordinate system into areas each composed of a plurality of pixels of N pixels in a first direction and M pixels in a second direction perpendicular to said first direction, i.e. N×M pixels in total, and by allocating N×M rendering circuits respectively to the N×M pixels contained in that area, comprises a first step of calculating variations of the rendering data with respect to the first and second directions necessary for interpolating values of the rendering data in each pixel within a predetermined graphic from predetermined apex data of the predetermined graphic; a second step of calculating an initial value of the rendering data with respect to the coordinate in the first direction which becomes the reference for computing the rendering data with respect to said second direction by means of interpolation by using the value of the predetermined apex data and the variation of the rendering data with respect to the first direction; and a third step of calculating the rendering data of the pixel in the second direction by means of interpolation by using the above-mentioned initial value and the variation of the rendering data with respect to the second direction by utilizing N×M rendering circuits in parallel.

The specific nature of the invention, as well as other objects, uses and advantages thereof, will clearly appear from the following description and from the accompanying drawings.

DESCRIPTION OF PREFERRED EMBODIMENT

Figure 2:
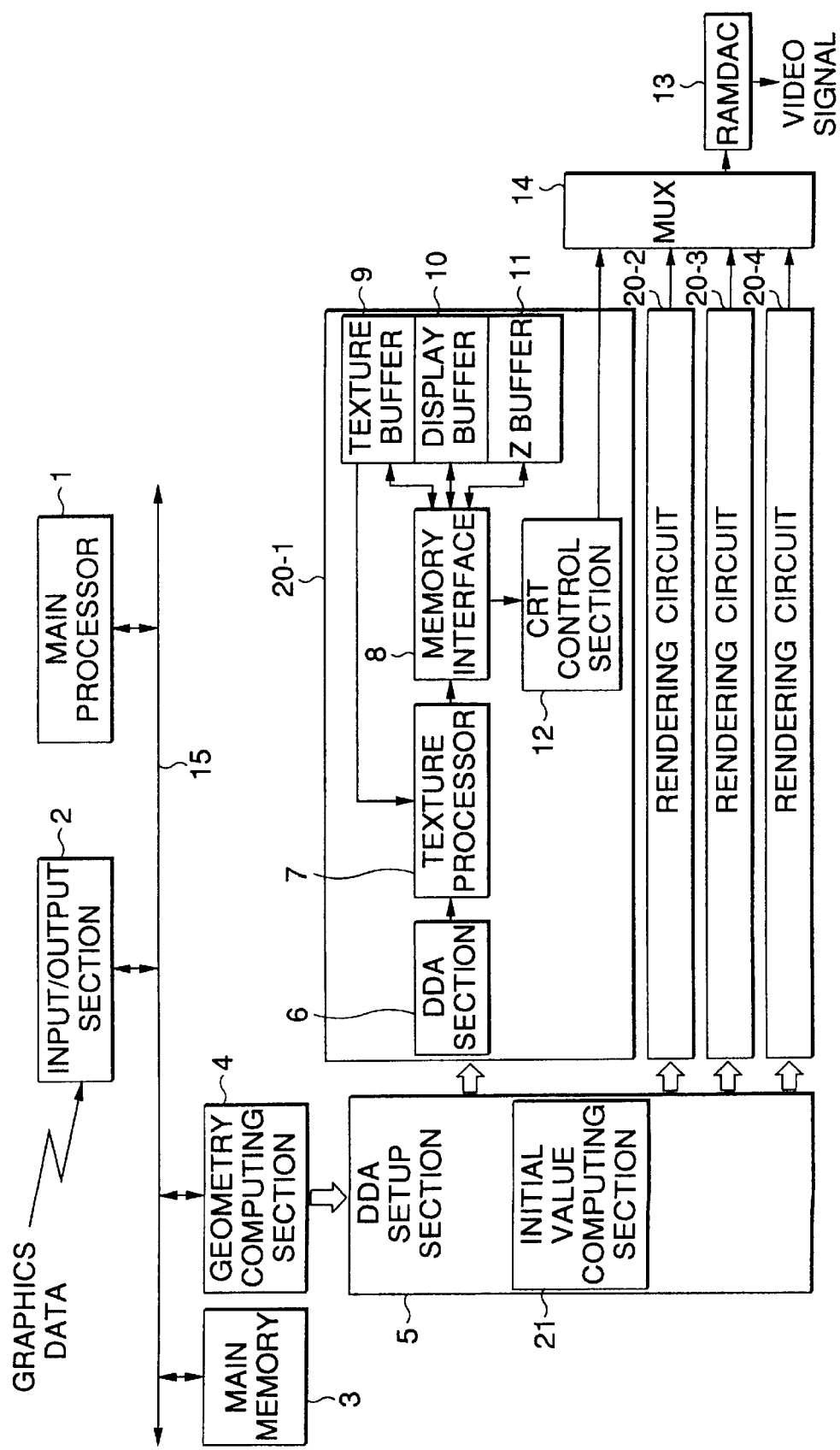
FIG. 2 is a block diagram showing a structure of a rendering system according to one embodiment of the present invention.

FIG. 2 is a diagram showing a structure of one embodiment of the inventive rendering system. A main processor 1 outputs graphic data supplied via an input/output section 2 or polygon graphic data stored in a main memory 3 to a geometry computing section 4. It is noted that such polygon graphic data is generated in accordance to a predetermined application program.

The geometry computing section 4 implements such processes as coordinate transformation, clipping, writing and the like to the graphic data supplied from the main processor 1 and outputs, as graphics data (polygon rendering data) after the processing, coordinates X, Y and Z corresponding to each apex of a triangular polygon, values of brightness R, G and B corresponding to red, green and blue, respectively, a coefficient of blend α representing a ratio in which a value of brightness of a pixel to be drawing and a value of brightness of a pixel stored in a display buffer 10, texture coordinates S, T and Q, and a coefficient of fog F to a DDA setup section 5 (first interpolation computing means). It is noted that because the coordinate system is transformed into a two-dimensional coordinate system of the display screen in the geometry computing section 4, the coordinate Z denotes information of depth at that point.

It is noted that the S, T and Q which are homogeneous coordinate systems are output as the texture coordinates, what S/Q and T/Q are multiplied by a texture size, respectively, are utilized as actual texture coordinates. Further, the coefficient of fog F is a coefficient indicative of a degree in blending a predetermined fog color blended in presenting the display at the point of Z, when it is significant for example, as if it is fogged.

The DDA setup section 5 calculates variations of polygon rendering data with respect to the X direction ($\Delta Z/\Delta X$, $\Delta R/\Delta X$, $\Delta G/\Delta X$, $\Delta B/\Delta X$, $\Delta\alpha/\Delta x$, $\Delta S/\Delta X$, $\Delta T/\Delta X$, $\Delta Q/\Delta X$ and $\Delta F/\Delta X$) and to the Y direction ($\Delta Z/\Delta Y$, $\Delta R/\Delta Y$, $\Delta G/\Delta Y$, $\Delta B/\Delta Y$, $\Delta\alpha/\Delta Y$, $\Delta S/\Delta Y$, $\Delta T/\Delta Y$, $\Delta Q/\Delta Y$ and $\Delta F/\Delta Y$) from the polygon rendering data X, Y, Z, R, G, B, α, S, T, Q and F of each apex of the supplied triangle. It also calculate a gradient (or its inverse number) of each side of the triangle.

The DDA setup section 5 also discriminates the type of the shape of the triangle from the coordinates of the apexes of the triangle (polygon), calculates values of each polygon rendering data on a point ($X_0$, $Y_0$) (see FIG. 4) on a side AC having a coordinate in the same Y direction with the rendering starting point corresponding to each rendering circuit 20-k (k=1, 2, 3, 4) by an initial value computing section 21 and outputs the values to a DDA section 6 of each rendering circuit 20-k.

Figure 3:
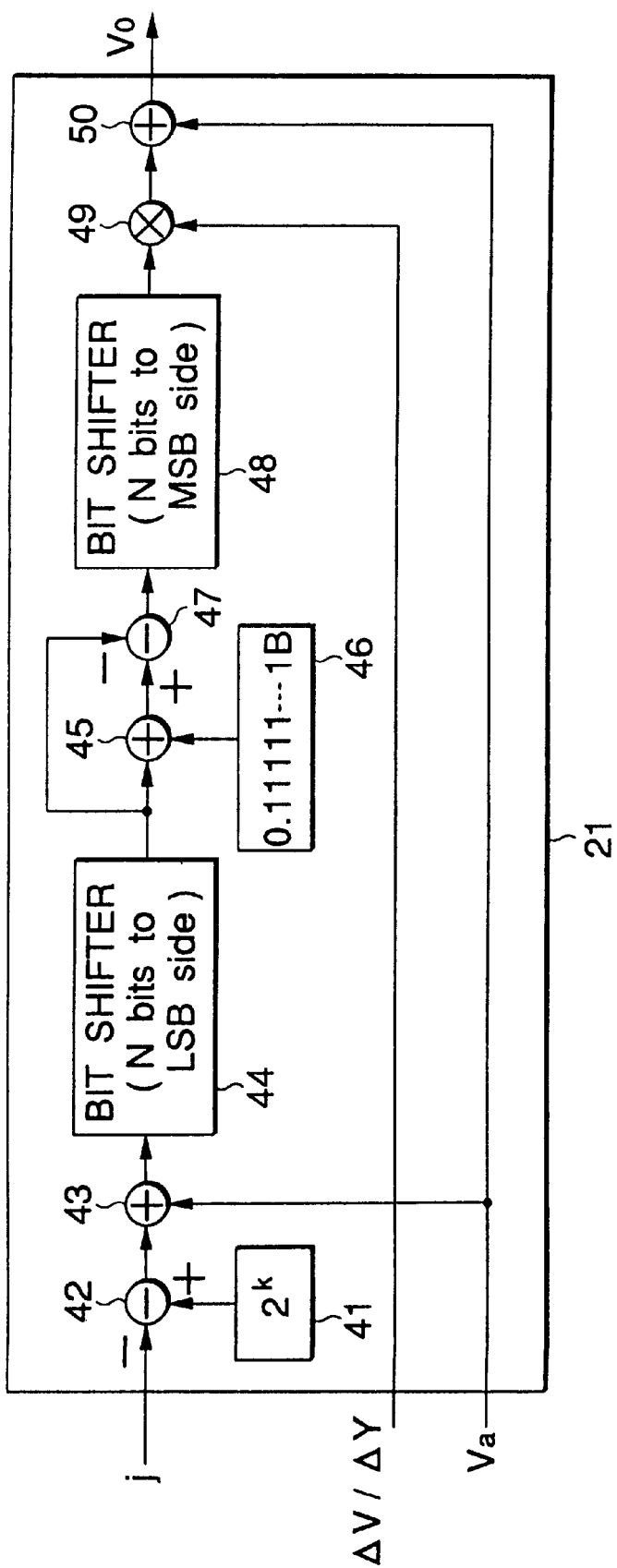
FIG. 3 is a block diagram showing a structural example of an initial value computing section in FIG. 2.

FIG. 3 shows a structural example of the initial value computing section 21 in the DDA setup section 5. It is noted that each value is represented by fixed-point real number in the initial value computing section 21.

A constant generating circuit 41 generates a value $2^N$ (a number of pixels in the Y direction in that area) corresponding to a number of rendering circuits 20-k, $2^N \times 2^N$, (i.e. a number of pixels composing the area to be processed in parallel) and outputs that value to a subtracter 42.

The subtracter 42 calculates a difference ($2^N$–i) between a number i (described later) in the Y direction (first direction) of the pixel to be processed by the rendering circuit 20-k and the value $2^N$ from the constant generating circuit 41 and outputs the result of the calculation to an adder 43.

The adder 43 calculates a sum (Va+$2^N$–i) of the value ($2^N$–i) from the subtracter 42 with the value Va of data at the apex A and outputs the result to a bit shifter 44.

The bit shifter (barrel shifter) 44 bit-shifts the value (Va+$2^N$–i) supplied from the adder 43 by N bits to the side of LSB (Least Significant Bit) and outputs the bit-shifted value ((Va+$2^N$–i)/$2^N$) to an adder 45 and a subtracter 47.

A constant generating circuit 46 generates a value in which the value of each bit below the point of the fixed-point real number is 1 (0, 111 . . . 1B) and outputs the value to the adder 45.

The adder 45 adds the value (0, 111 . . . 1B) from the constant generating circuit 46 to the value ((Va+$2^N$–i)/2N) from the bit shifter 44 and after omitting the part of the calculation result below the decimal point, outputs the value (integer part) to the subtracter 47. That is, the adder 45 outputs a fixed-point real number whose value is equal with the least integer (ccil ((Va+$2^N$–i)/$2^N$)) among the integers greater than the value supplied from the bit shifter 44.

The subtracter 47 calculates a difference (ccil ((Va+$2^N$–i)/2N))–(Va+$2^N$–i)/$2^N$) between the value from the bit shifter 44 and that from the adder 45 and outputs the result to a bit shifter 48.

The bit shifter (barrel shifter) 48 bit-shifts the value supplied from the subtracter 47 by N bits to the side of the MSB (Most Significant Bit) and outputs the bit-shifted value ((ccil ((Va+$2^N$–i)/$2^N$))–(Va+$_2^N$–i)/$2^N$) ×2N) to a multiplier 49.

The multiplier 49 calculates a product ((ccil ((Va+$2^N$–i)/$2^N$)/$2^N$)–(Va+$2^N$–i)/$2^N$)×$2^N$×$\Delta V/\Delta Y$) of the value from the bit shifter 48 and a variation $\Delta V/\Delta Y$ in the Y direction corresponding to the data to be calculated this time and outputs the result to an adder 50.

The adder 50 outputs a sum (Va+(ccil ((Va+$2^N$–i)/$2^N$))–(Va+$2^N$–i)/$2^N$)×$2^N$×$\Delta V/\Delta Y$) of the value from the multiplier 49 and the value Va at the apex A of the data for calculating the value at the point ($X_0$, $Y_0$) this time as an initial value (value at the above-mentioned point ($X_0$, $Y_0$)) of the data to be calculated this time.

Figure 1:
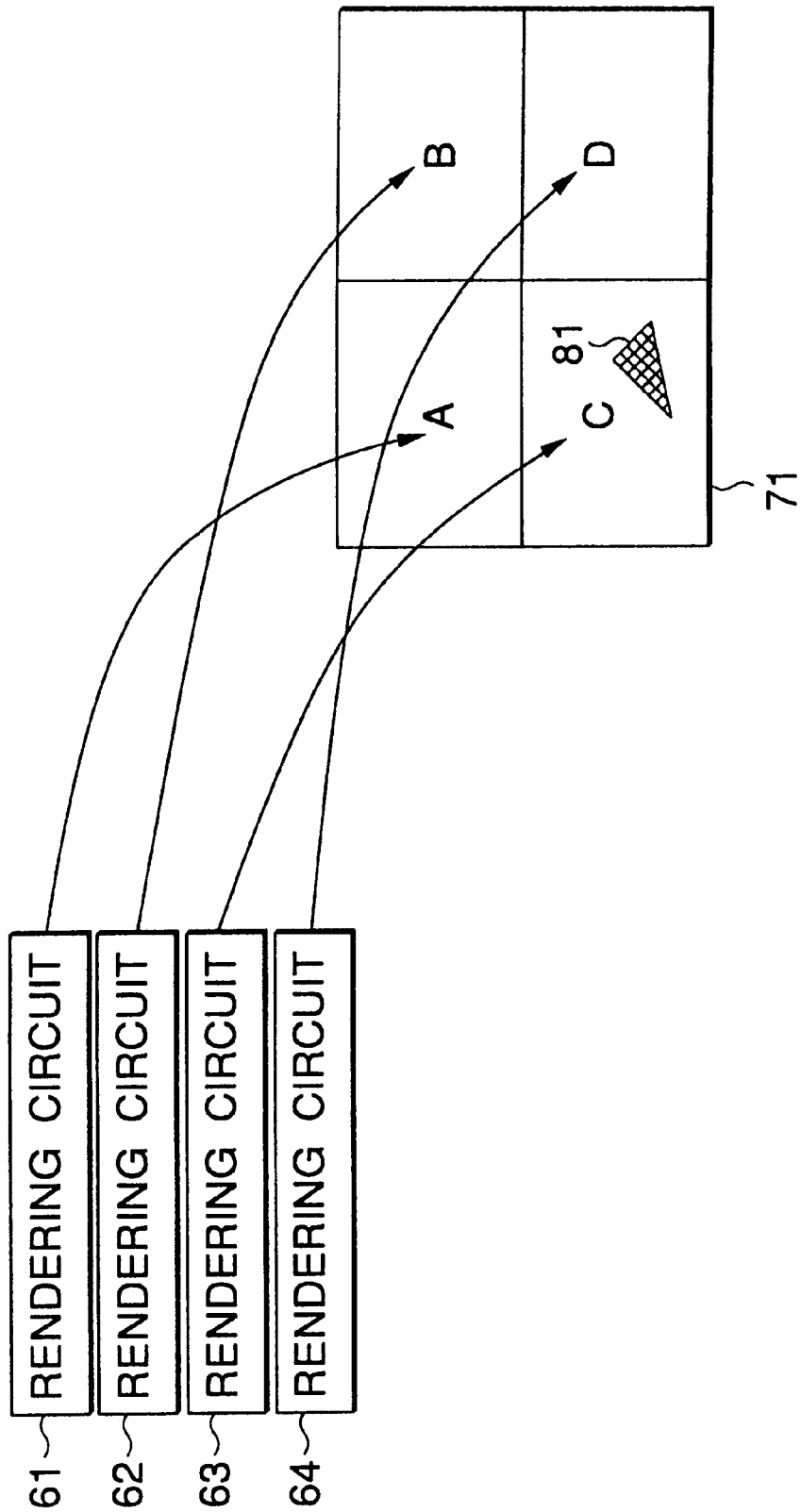
FIG. 1 is a diagram showing one example of a rendering process implemented by a plurality of rendering circuits.
Figure 5:
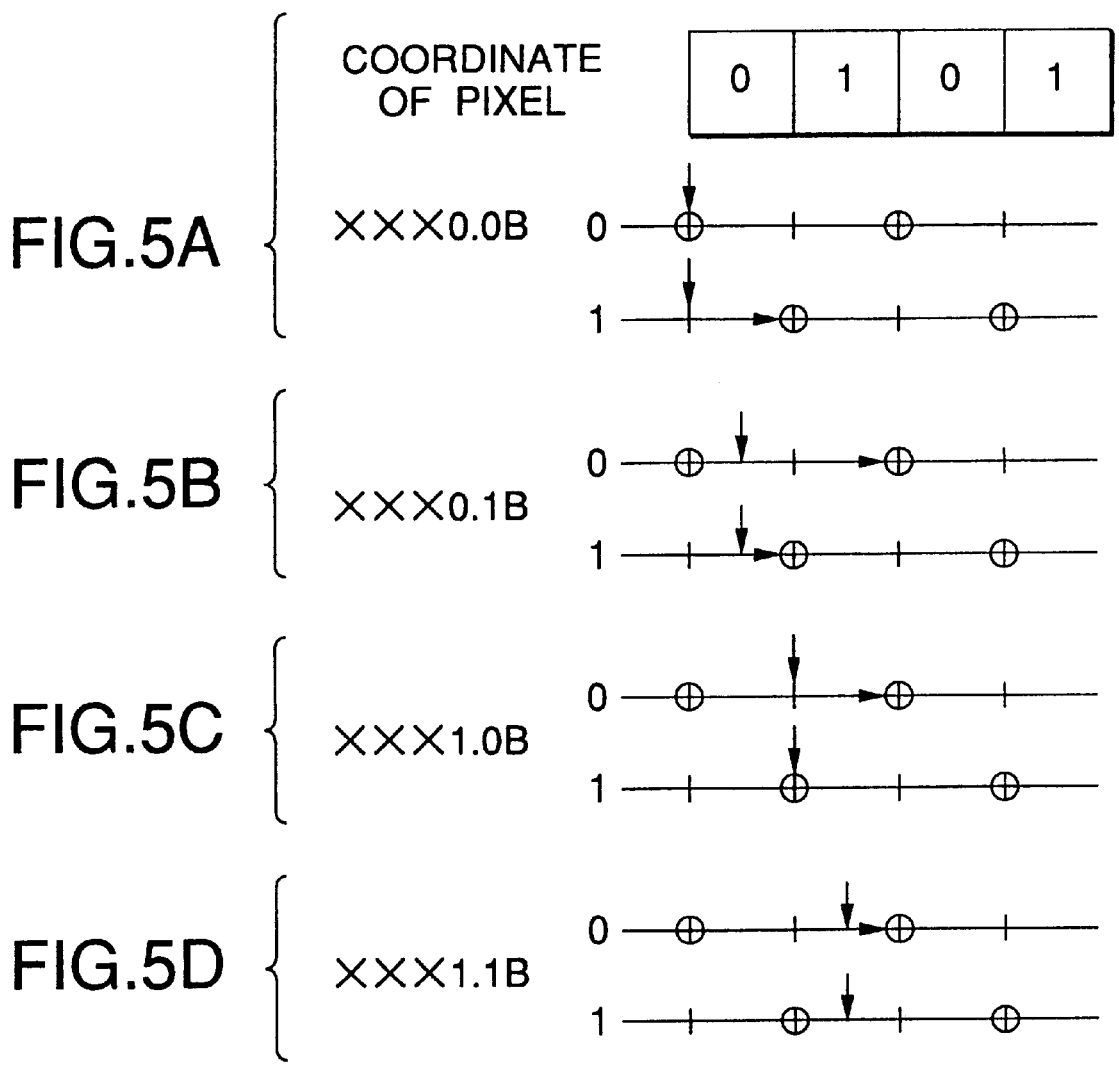
FIGS. 5A through 5D are diagrams showing examples in calculating initial values of data.

The DDA section 6 of the rendering circuit 20-1 in FIG. 1 contains a circuit (not shown) similar to the above-mentioned initial value computing section 21 and implements DDA (Digital Differential Analyzer) operation. At first, it calculates a value Vi of each polygon rendering data corresponding to a first pixel among the pixels allocated to the rendering circuit 20-1 (the pixel closest to the side AC among the allocated pixels) in a predetermined span (an array of pixels arranged in the X direction shown in FIG. 5 for example) from the variation of each polygon rendering data in the X direction supplied from the DDA setup section 5 and the initial value $V_0$ of each polygon rendering data corresponding to the span. Next, it calculates sequentially the coordinates X and Y corresponding to each pixel of that span and the values of polygon rendering data X, Y, Z, R, G, B, α, S, T, Q and F in that coordinate and outputs them to a texture processor 7.

It is noted that the DDA section 6 calculates the values of rendering data of the pixel per every predetermined number of pixels.

The texture processor 7 in the rendering circuit 20-1 calculates the actual texture coordinate by reading texture data from a texture buffer 9, by dividing the supplied texture coordinates S and T by Q and by multiplying it with the texture size. It also calculates from the read texture data the value of brightness at a texture address corresponding to the actual texture coordinates S and T and a coefficient (value α of texture) representing a blending ratio of the texture data. Then, in correspondence to the coefficient, it blends the value of brightness supplied from the DDA section 6 with the value of brightness corresponding to the texture.

The texture processor 7 also blends the predetermined fog color in correspondence to the coefficient of fog F and outputs the generated value of brightness as a value of brightness corresponding to the pixel at the coordinates X and Y supplied from the DDA section 6 to a memory interface 8 together with the coordinates X, Y and Z and the coefficient of blend α.

It is noted that the texture buffer 9 stores texture data corresponding to each level such as MIPMAP in advance.

Referring to the value Z in a Z buffer 11, the memory interface 8 of the rendering circuit 20-1 updates the Z value of the Z buffer 11 by the supplied coordinate Z and writes the supplied value of brightness to an address corresponding to the coordinates (X, Y) in a display buffer 10 when the supplied pixel is located in front (on the side of point of view) of what has been rendered before.

It is noted that when the memory interface 8 is arranged so as to implement the blend α, it blends the value of brightness stored in the display buffer 10 with the supplied value of brightness in correspondence to the supplied coefficient of blend α and writes the generated value of brightness to the display buffer 10.

A CRT control section 12 of the rendering circuit 20-1 generates a display address in synchronism with predetermined horizontal and vertical synchronous signals, controls the memory interface 8 to transfer the value of brightness corresponding to the display address per every predetermined number of values in batch to store those values in a built-in FIFO section (not shown) once and to output index values of the data to a multiplexer 14 at predetermined intervals.

It is noted that because the rendering circuits 20-2 through 20-4 are constructed in the same manner with the rendering circuit 20-1, their explanation will be omitted here.

The multiplexer 14 arrays the index values supplied from the rendering circuits 20-1 through 20-4 in a predetermined order and then outputs them to an RAMDAC 13.

The RAMDAC 13 has a RAM section and a DAC (Digital/Analog Converter) section not shown. It stores the values of brightness corresponding to the index values in the RAM section in advance, supplies the values of brightness corresponding to the index values supplied from the multiplexer 14 from the RAM section to the DAC section, converts the values of brightness (RGB values) from digital to analog in the DAC section and outputs the analog video signals (RGB signals) to a predetermined device not shown.

Next, the operation of the rendering system shown in FIG. 2 in rendering polygons will be explained.

At first, the main processor 1 outputs polygon data to the geometry computing section 4.

The geometry computing section 4 implements such processes as coordinate transformation, clipping, writing and the like to the graphic data supplied from the main processor 1 and outputs coordinates X, Y and Z corresponding to each apex of a triangle (polygon), values of brightness R, G and B. a coefficient of blend α, texture coordinate S, T and Q, and a coefficient of fog F to the DDA setup section 5.

Next, as a pre-process of rendering, the DDA setup section 5 discriminates the shape of the triangular polygon. At this time, among three apexes, the DDA setup section 5 determines the apex whose coordinate in the Y direction is smallest as apex A (FIG. 6), the apex whose coordinate in the Y direction is the largest as apex C and the remaining apex as apex B. It is noted that when there are two apexes whose coordinate in the Y direction is smallest, the DDA setup section 5 (FIG. 5) determines either one of those two apexes as apex A and the other as apex B.

Then, the DDA setup section 5 calculates variations of polygon rendering data with respect to the X and Y directions utilized in calculating values of polygon rendering data X, Y, Z, R, G, B, α, S, T, Q and F in each pixel within the polygon by means of interpolation from the values of the polygon rendering data of the three apexes of the polygon, respectively.

After calculating each variation, the DDA setup section 5 calculates values of each polygon rendering data at the point $(X_0, Y_0)$ on the side AC having the same coordinate with the coordinate $Y_0$ of the pixel in the Y direction to be processed respectively by the rendering circuits 20-1 through 20-4 and outputs such data to the DDA section 6 of the corresponding rendering circuits 20-1 through 20-4 together with each variation in the X direction.

At this time, the DDA setup section 5 calculates a value $V_0$ of each polygon rendering data at the point $(X_0, Y_0)$ corresponding to each rendering circuit 20-k (k=1, 2, 3, 4) by the initial value computing section 21 in accordance to the following expression:

$$V_0 = Va + ((ccil((Va + 2^N - i)/2^N) - (Va + 2^N - i)/2^N) \times 2^N) \times \Delta V / \Delta Y$$

$$= Va + ((ccil((Va + 2^N - i) \gg N) - (Va + 2^N - i) \gg N) \ll N) \times \Delta V / \Delta Y,$$

where, Va denotes a value of predetermined polygon rendering data V at the apex A, $2^N$ denotes a number of pixels in one side of an area to be processed by the rendering circuit in parallel, and i denotes the number of each rendering circuit in the Y direction. Further, A>>N denotes a value when a predetermined value A is bit-shifted to the LSB side by N bits and A<<N denotes a value when the predetermined value A is bit-shifted to the MSB side by N bits.

Figure 4:
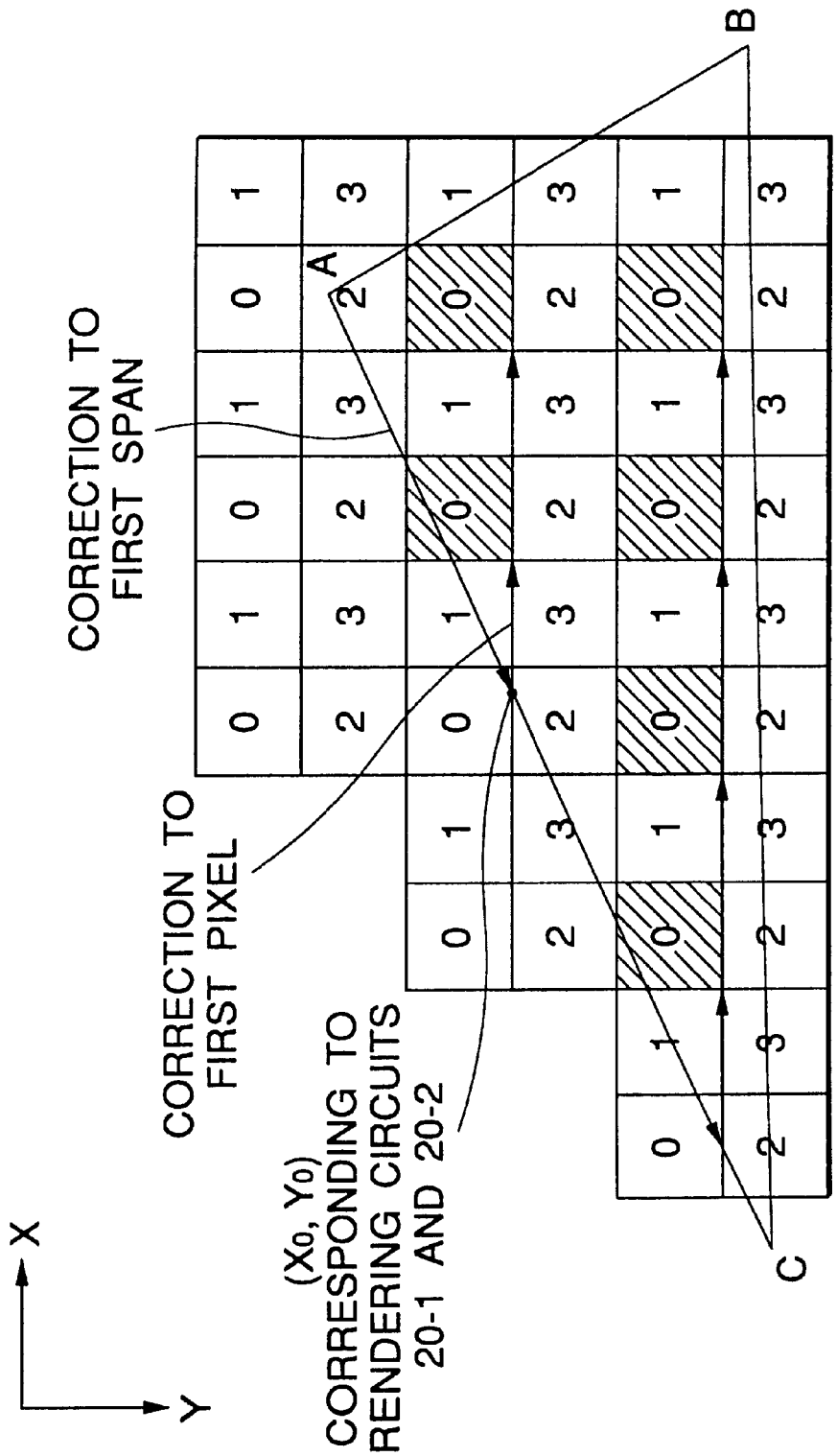
FIG. 4 is a diagram showing one example in allocating pixels to rendering circuits.

In this case, N=1 because each pixel is processed in parallel per area of 2×2 pixels as shown in FIG. 4 in the four rendering circuits 20-1 through 20-4. It is noted that in this case, the pixels 0 through 3 in the figure are allocated to be processed to the rendering circuits 20-1 through 20-4, respectively. Accordingly, i=0 with respect to the rendering circuits 20-1 and 20-2 and i=1 with respect to the rendering circuits 20-3 and 20-4. It is noted that in FIG. 4, each pixel is represented by the coordinate at the lower left corner of the pixel.

For instance, $Y_0$ may be calculated by the following expressions in the rendering circuits 20-1 and 20-2 wherein i=0:

$$Y_0 = Ya + ((ccil((Ya + 2) \gg 1) - (Ya + 2) \gg 1) \ll 1)$$

$$= Ya + ((ccil((Ya \gg 1) - (Ya \gg 1) \ll 1)$$

On the other hand, $Y_0$ is calculated as follows in the rendering circuits 20-3 and 20-4 wherein i=1.

$$Y_0 = Ya + ((ccil\ ((Ya+1) \gg 1) - (Ya+1) \gg 1) \ll 1)$$

Then, as shown in FIG. 5A, when the value of Ya is xxx0.0B (x is an arbitrary number among 0 and 1 and B denotes a binary number), $Y_0$ is calculated as follows in the rendering circuits 20-1 and 20-2 wherein i=0:

$$Y_0 = xxx0.0B + ((ccil(xxx0.0B \gg 1) - (Ya \gg 1) \ll 1)$$

$$= xxx0.0B + ((ccil(xxx.00B) - xxx.00B) \ll 1)$$

$$= xxx0.0B$$

On the other hand, when Ya=xxx0.0B, $Y_0$ is calculated as follows in the rendering circuits 20-3 and 2-4 wherein i=1:

$$Y_0 = xxx0.0B + ((ccil(xxx0.0B + 1) \gg 1) - (xxx0.0B + 1) \gg 1) \ll 1)$$

$$= xxx0.0B + ((ccil(xxx.10B) - xxx.10B) \ll 1)$$

$$= xxx0.0B + ((xxxB + 1 - xxx.10B) \ll 1)$$

$$= xxx0.0B + (0.10B \ll 1)$$

$$= xxx0.0B + 1.0B$$

$$= xxx1.0B$$

When Ya=xxx0.1B and i=0 as shown in FIG. 5B, $Y_0$ is calculated in the same manner as (xxx0.1B+1.1B) and is calculated as (xxx0.1B+0.1B) when i=1.

When Ya=xxx1.0B and i=0 as shown in FIG. 5C, $Y_0$ is calculated in the same manner as (xxx1.0B+1.0B) and is calculated as xxx1.0B when i=1.

Further, when Ya=xxx1.1B and i=0 as shown in FIG. 5D, $Y_0$ is calculated in the same manner as (xxx1.1B+0.1B) and is calculated as (xxx1.1B+1.1B) when i=1.

Thus, the DDA setup section 5 calculates the Y coordinate $Y_0$ of the span to be rendered at first by each rendering circuit in correspondence to the value of i and calculates the initial value $V_0$ of each polygon rendering data in the same manner.

Further, after calculating the coordinate $Y_0$ in the Y direction of the first span corresponding to each rendering circuit 20-k, the DDA setup section 5 calculates the coordinate in the Y direction of the span to be processed next by each rendering circuit 20-k and data V in that coordinate sequentially by interpolation by setting the variation as $2^N \times \Delta V/\Delta Y$.

Figure 6:
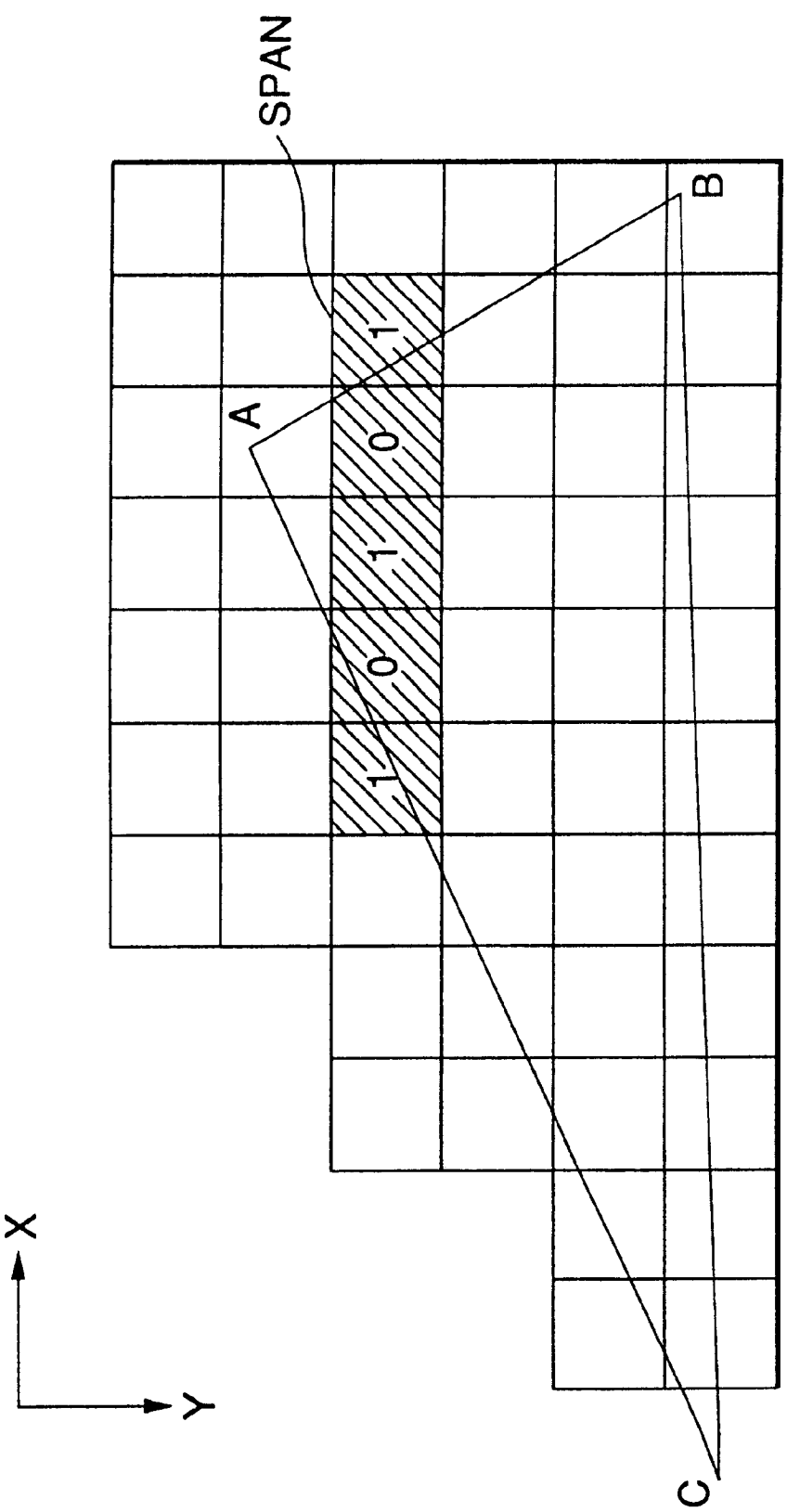
FIG. 6 is a diagram showing one example a span.

Then, the DDA section 6 of each rendering circuit 20-k (k 1, 2, 3, 4) implements the DDA operation and renders the pixel allocated to the rendering circuit 20-k in the span corresponding to the data supplied from the DDA setup section 5. In this case, one span is processed by the two rendering circuits as shown in FIG. 6.

At this time, the DDA section 6 of the rendering circuit 20-k calculates the value of polygon rendering data of the pixel closest to the side AC among the pixels allocated to the rendering circuit 20-k from the point ($X_0$, $Y_0$) and then calculates the value of polygon rendering data of each pixel per ($2^N-1$) pixels.

That is, the DDA section 6 calculates a value Vi of the polygon rendering data of the pixel closest to the side AC from the value $V_0$ of each polygon rendering data at the point ($X_0$, $Y_0$) corresponding to the rendering circuit 20-k in accordance to the following expressions:

$$Vi = V_0 + ((ccil((V_0 + 2^N - j)/2^N) - (V_0 + 2^N - j)/2^N) \times 2^N) \times \Delta V/\Delta Y$$

$$= V_0 + ((ccil((V_0 + 2^N - j) \gg N) - (V_0 + 2^N - i) \gg N) \ll N) \times \Delta V/\Delta Y,$$

where, j denotes a number of each rendering circuit in the X direction. In this case (i.e. when the pixels 0 through 3 shown in FIG. 4 are allocated to the rendering circuits 20-1 through 20-4 as described above), j=0 with respect to the rendering circuits 20-1 and 20-3 and j=1 with respect to the rendering circuits 20-2 and 20-4. It is noted that this calculation is implemented in the DDA section 6 in a circuit similar to the initial value computing section 21 of the DDA setup section 5. At this time, Vi corresponding to each rendering circuit 20-k is output by inputting j instead of i in FIG. 3, by inputting $\Delta V/\Delta X$ instead of $\Delta V/\Delta Y$ and by inputting $V_0$ instead of Va.

Then, the DDA section 6 implements interpolation by setting the variation of each polygon rendering data V as $2N \times \Delta V/\Delta X$, calculates the value of polygon rendering data of the allocated pixel and outputs them sequentially to the texture processor 7.

The texture processor 7 reads the texture data from the texture buffer 9 and by utilizing that data, transforms the texture coordinate supplied from the DDA section 6 into an actual texture coordinate. It then calculates values of brightness in the texture address corresponding to the actual texture coordinates S and T and a coefficient (value α of the texture) representing a blending ratio of the texture data and blends the value of brightness supplied from the DDA section 6 with the value of brightness corresponding to the texture in correspondence to the coefficient.

The texture processor 7 also blends the value of brightness blended in correspondence to the value α of the texture with a predetermined fog color in correspondence to the coefficient of fog F and outputs the generated value of brightness to the memory interface 8 together with the coordinates X, Y and Z and the blending coefficient α as the value of brightness corresponding to the pixel at the coordinates X and Y supplied form the DDA section 6.

Then, the memory interface 8 reads the Z value in the Z buffer 11 to determine whether or not the pixel supplied from the texture processor 7 is located in front (on the side of point of view) of one rendered before. When the supplied pixel is located in front of the previously rendered pixel, the memory interface 8 updates the Z value of the Z buffer 11 by the supplied coordinate Z and writes the supplied value of brightness to the address corresponding to that coordinate in the display buffer 10.

When the supplied pixel is located behind the previously rendered one, the memory interface 8 discards the supplied data.

It is noted that when it is set so as to implement a blend, the memory interface 8 blends the value of brightness stored in the display buffer 10 with the supplied value of brightness in a ratio of α: (1−α) in correspondence to the coefficient of blend α supplied from the texture processor 7 and writes the generated value of brightness into the display buffer 10.

After scaling the supplied coordinates X and Y to $1/2^N$ (inverse number of the number of pixels of each side in the above-mentioned area processed in parallel), respectively, the memory interface 8 writes the value of brightness into the memory area of the display buffer 10 corresponding to that value. Thereby, the values of brightness are stored in the display buffer 10 without leaving a space between them.

Then, the values of brightness written to the display buffer 10 are transferred to the CRT control section 12 via the memory interface 8 in correspondence to the display addresses generated by the CRT control section 12 in synchronism with the horizontal and vertical synchronous signals and are stored once in the FIFO section of the CRT control section 12. Then, index values corresponding to the values of brightness are output to the multiplexer 14 at predetermined intervals.

Thus, the rendering circuit 20-k operates respectively and calculates in parallel the value of the polygon rendering data in the pixel allocated in advance.

Then, the index values supplied from the rendering circuits 20-1 through 20-4 are arranged in a predetermined order by the multiplexer 14 and are output to the RAMDAC 13. Then, analog video signals (RGB signals) obtained by converting the values of brightness (RGB values) corresponding to the index values from digital to analog are output to a predetermined device not shown.

It is noted that although the number of pixels in the area processed in parallel is 2×2 in the above-mentioned embodiment, it may be another number. When the number of pixels in each side of this area is an integer power of 2, the circuit is simplified and the cost may be reduced because the above-mentioned $V_0$ and Vi may be calculated by implementing bit-shift instead of the division. As described above, the inventive rendering method and the rendering system allow the rendering in the definition of sub-pixel level to be implemented in parallel because it is arranged such that the variations of the rendering data with respect to the first and second directions necessary for interpolating values of the rendering data in each pixel within a predetermined graphic is calculated from predetermined apex data of the predetermined graphic, the initial value of the rendering data with respect to the coordinate in the first direction which becomes the reference for computing the rendering data with respect to the second direction is calculated by means of interpolation by using the value of the predetermined apex data and the variation of the rendering data with respect to the first direction and the rendering data of the pixel in the second direction is calculated by means of interpolation by using the N×M rendering circuits in parallel as well as the above-mentioned initial value and the variation of the rendering data with respect to the second direction.

It is noted that the various modifications and applications are conceivable within the scope of the gist of the invention. Accordingly, the gist of the present invention is not limited to the embodiment described here.

What is claimed is:

1. A rendering apparatus for processing rendering data (Vi) for pixels defining a predetermined graphic, said rendering data (Vi) processed in parallel by dividing a two-dimensional image coordinate system into a plurality of pixel areas each composed of N pixels in a first direction and M pixels in a second direction perpendicular to said first direction, each of said plurality of pixel areas thus having a total of N×M pixels, said rendering apparatus comprising:

calculating means for calculating variations of said rendering data with respect to said first and second directions, said variations used for interpolating values of said rendering data (Vi) for each of said pixels from predetermined apex data of said predetermined graphic, said calculating means also for calculating an initial value ($V_0$) of said rendering data with respect to the coordinate in said first direction, said initial value ($V_0$) serving as a reference for computing said rendering data with respect to said second direction, said initial value ($V_0$) calculated by means of interpolation by using the value of said predetermined apex data and said variation of said rendering data with respect to said first direction; and N×M computing means, one of said N×M computing means corresponding to one of said N×M pixels contained in said pixel area, each one of said computing means for calculating said rendering data of said pixel with which it corresponds in said second direction, by means of interpolation by using said initial value ($V_0$) and said variation of said rendering data with respect to said second direction.

2. A rendering method for processing rendering data (Vi) for pixels defining a predetermined graphic, said rendering data (Vi) processed in parallel by dividing a two-dimensional image coordinate system into a plurality of pixel areas each composed of N pixels in a first direction and M pixels in a second direction perpendicular to said first direction, each of said plurality of pixel areas thus having a total of N×M pixels, said rendering method comprising the steps of:

calculating variations of said rendering data with respect to said first and second directions, said variations used for interpolating values of said rendering data (Vi) from predetermined apex data of said predetermined graphic;

calculating an initial value ($V_0$) of said rendering data with respect to the coordinate in the first direction, said initial value ($V_0$) serving as a reference for computing said rendering data with respect to said second direction, said initial value ($V_0$) calculated by means of interpolation by using the value of the predetermined apex and the variation of said rendering data with respect to the first direction; and for each one of said N×M pixels, calculating said rendering data of said pixel in the second direction by means of interpolation by using said initial value ($V_0$) and said variation of said rendering data with respect to the second direction, said calculating for each one of said pixels occurring in parallel with said calculating for each of the other said pixels.

* * * * *

UNITED STATES PATENT AND TRADEMARK OFFICE
CERTIFICATE OF CORRECTION

PATENT NO. : 6,184,903 B1
DATED : February 6, 2001
INVENTOR(S) : Mutsuhiro Omori It is certified that error appears in the above-identified patent and that said Letters Patent is hereby corrected as shown below:

Column 5, Line 66, change "(FIG.5)", to read —(FIG.2)—.

Signed and Sealed this

Fifth Day of June, 2001

*Attest:*

*Attesting Officer*

NICHOLAS P. GODICI
*Acting Director of the United States Patent and Trademark Office*